(No Model.)

J. F. KELLY.
ALTERNATING CURRENT GENERATOR.

No. 529,918. Patented Nov. 27, 1894.

WITNESSES: Frank S. Ober, John A. Stagg

INVENTOR: John Forrest Kelly
BY H. B. Brownell, his ATTORNEY

UNITED STATES PATENT OFFICE.

JOHN FORREST KELLY, OF PITTSFIELD, MASSACHUSETTS, ASSIGNOR TO THE STANLEY LABORATORY COMPANY, OF SAME PLACE.

ALTERNATING-CURRENT GENERATOR.

SPECIFICATION forming part of Letters Patent No. 529,918, dated November 27, 1894.

Application filed August 18, 1894. Serial No. 520,664. (No model.)

*To all whom it may concern:*

Be it known that I, JOHN FORREST KELLY, of the city of Pittsfield, county of Berkshire, and State of Massachusetts, have invented a certain new and useful Alternating-Current Generator, of which the following is a specification.

My invention relates to improvements in alternating current generators and has for its object to provide a generator which shall produce a current best adapted for use in systems of distribution in which alternating current motors and transformers are used.

In the operation of alternating current motors and also of transformers it is of considerable importance that the currents and magnetic fluxes should vary sinusoidally, for experience has shown that the more nearly such a condition is approached the less are the losses and idle currents. A first step toward obtaining these conditions is the making of the impressed electromotive force of the generator sinusoidal. To accomplish this it is necessary and sufficient that the magnetic flux through the armature coils should vary sinusoidally. Now the flux between a field pole and the opposite iron of the armature distributes itself so that it is at every point inversely proportional to the reluctance of the gap at that point, or since the reluctance is proportional to the distance from the field pole piece to the armature iron the flux is at every point inversely proportional to that distance. This is true of the various kinds of generators, and in my invention these principles are made use of to attain the objects above stated.

The kind of generator to which I have applied my invention is of the type shown in patent to William Stanley, Jr., and John F. Kelly, No. 499,446, dated June 13, 1893, in which there are two sets or groups of unlike field poles on a cylinder, the sets or groups of unlike poles being in parallel planes on the opposite sides of an energizing coil surrounding the cylinder at its center.

Figure 1:
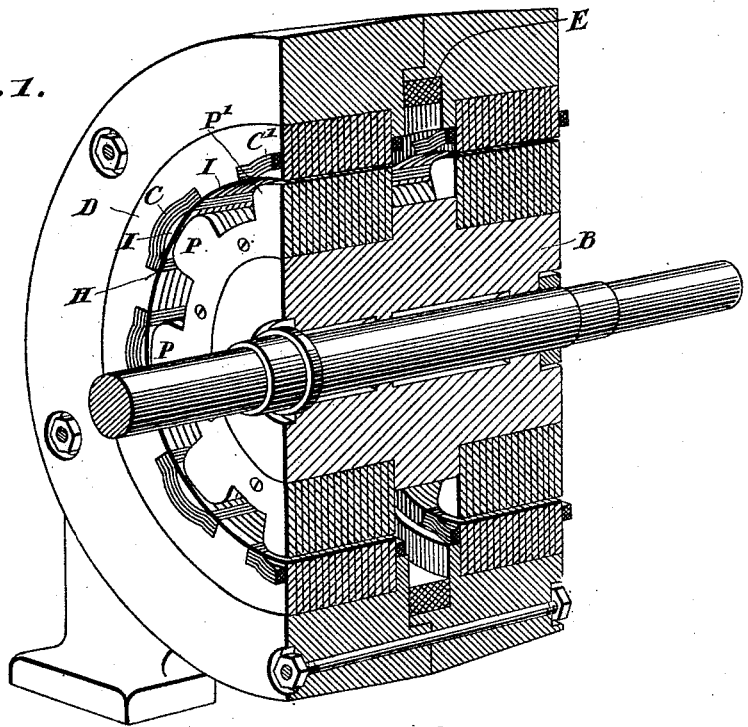
Figure 2:
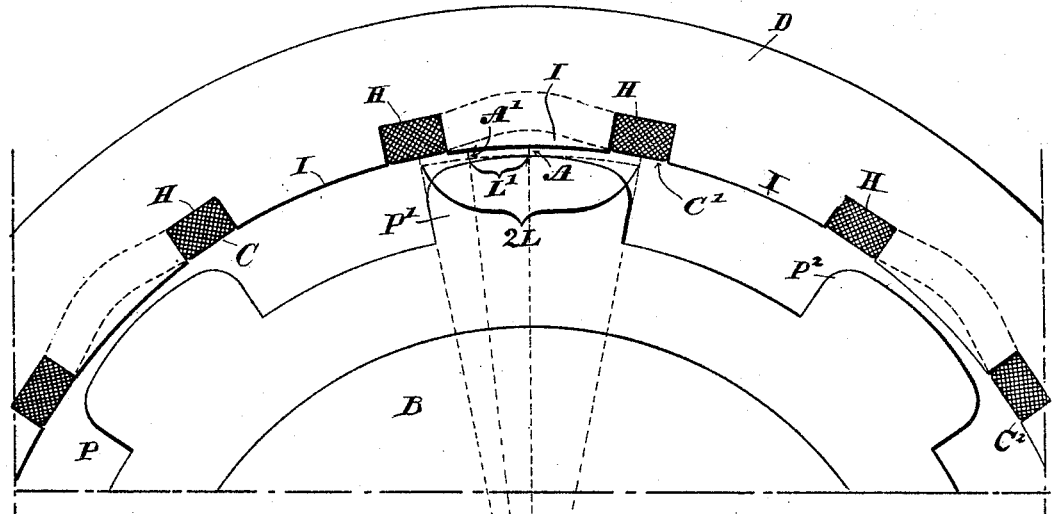

Figure 1 represents in perspective a section of parts of such a generator of the single phase type showing the field pole pieces and the armature frame and coils. Fig. 2 is a partial side elevation showing on an enlarged scale the relations of the field pole pieces and the armature frame.

In the drawings B represents the field core, having the projecting pole pieces P, P', &c. E represents the energizing coil surrounding the field core.

C, C', &c., represent the armature coils carried by the frame D and connected in the usual manner. The armature frame D has a cylindrical surface divided by grooves H into equal parts I, I. In a single phase generator such as is shown in the drawings, parts I are in number twice the number of pole pieces on the field core and preferably every other division I, I, &c., is embraced by an armature coil C, C', &c., although every division may be so embraced. The pole pieces P, P' divide the field core into equal parts. They are so shaped that the surface of the iron of the armature frame D and the opposing surface of the respective pole pieces bear a certain relation to each other such that if the extreme width of a pole piece measured around the circumference is called $2^L$, and the clearance at the center of the pole is called A the clearance A' at any distance L' from the center of the pole measured on the same circumference is given by the equation $A' = \dfrac{A}{\cos \frac{1}{2}\pi \frac{L'}{L}}$. This formula, it will be noticed is the formula for an inverse sinusoidal curve but if the surface of the armature iron is the surface of a cylinder as shown, the curve of the surface of the pole piece is distorted in addition proportionately to the curvature of the cylinder. When the two surfaces bear the relation expressed by the formula above mentioned the clearance and with it the reluctance will vary in an inverse sinusoidal manner and consequently the flux will be sinusoidal; but if the flux distribution is sinusoidal, then the variation of the flux caused by the rotation of the poles will be sinusoidal, and the current will be sinusoidal. L is of such magnitude that if we call the number of poles of one name N, $2^{NL}$ will equal the semi-circumference.

When $\dfrac{L'}{L}$ is very nearly equal to unity it is sometimes difficult to follow the law exactly but this corresponds to the least important part of the curve, and great accuracy is not there necessary.

My invention can be used in generators of other forms than the particular form above described.

Having described my invention, what I claim is—

1. In an alternating current generator the combination of a field magnet and an armature having opposing faces, one of which bears to the other the relation expressed by the formula of an inverse sinusoidal curve, substantially as described.

2. An alternating current generator having a single exciting coil and a suitable armature, and two groups of unlike field pole pieces on opposite sides of the exciting coil, the faces of said pole pieces being so shaped that their curvature referred to the opposing armature surface may be expressed by the formula $A' = \dfrac{A}{\cos.\frac{1}{2}\pi\frac{L'}{L}}$ substantially as described.

3. In an alternating current generator the combination of an armature frame, having a cylindrical inner surface with a field magnet core mounted within said frame, and having pole pieces with curved surfaces, whose curve with relation to the opposing cylindrical surface may be expressed by the formula $A' = \dfrac{A}{\cos.\frac{1}{2}\pi\frac{L'}{L}}$ substantially as described.

JOHN FORREST KELLY.

Witnesses:
W. B. TOBEY,
A. C. CLARK.